Patented Sept. 23, 1952

2,611,779

UNITED STATES PATENT OFFICE 2,611,779

TRIALKYLSILYLPHENOXYSILANES

John L. Speier, Jr., Pittsburgh, Pa., assignor to Dow Corning Corporation, Midland, Mich., a corporation of Michigan No Drawing. Application September 18, 1950, Serial No. 185,514. In Great Britain November 29, 1949

11 Claims. (Cl. 260—448.8)

This invention relates to trialkylsilylphenoxysilanes and to their method of preparation.

Compounds disclosed herein are novel compositions of matter which are of utility as intermediates in the preparation of silyl substituted phenols and other valuable silicon compounds.

This invention relates to compounds of the type

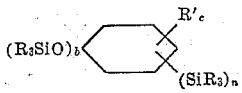

where R is an alkyl radical such as methyl, ethyl or octadecyl, R' is alkyl such as methyl, butyl, octadecyl and cyclohexyl or phenyl, $b$ has a value from 1 to 2, $c$ has a value from 0 to 1 and $n$ has a value from 1 to 2.

The above compounds may be prepared by reacting a halophenoxytrialkylsilane, a trialkylsilane and an alkali metal in accordance with the following equation:

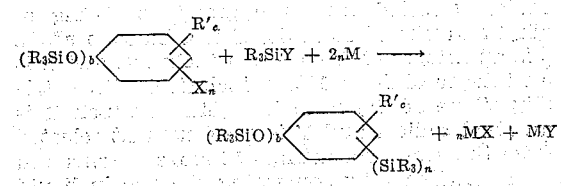

In the above reaction R may be the same or different alkyl radicals, X is halogen, Y is halogen or alkoxy and M is an alkali metal, preferably sodium or potassium.

The above reaction is preferably carried out in an inert solvent which boils above the melting point of the alkali metal employed. Such solvents include toluene, xylene, benzene and higher alkyl ethers and aliphatic hydrocarbons boiling above 65° C.

In general, a mixture of the silane and halophenoxysilane is added to a suspension of the molten alkali metal in the solvent at such a rate that the solution is maintained at reflux. Under such conditions condensation takes place readily to produce the compounds of this invention and an alkali metal halide or alkoxide. After reaction is complete the desired products are purified by distillation.

The halophenoxysilanes are prepared by reacting halophenols of the type

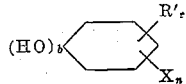

with silanes of the type R₃SiY in accordance with the method disclosed in the applicant's copending application filed concurrently herewith.

In general, the reaction is carried out by merely mixing the phenol and silane. Reaction begins at once whereupon condensation takes place between the phenolic hydroxyl and the silane Y group to produce phenoxysilanes and either HCl or an alcohol.

Silanes of the type R₃SiY are well known, commercial materials.

In addition to being valuable intermediates for the preparation of other organosilicon compounds, the trialkylsilylphenoxy products of this invention are useful as heat exchange media and as thermo expansion fluids.

The following examples are illustrative only.

EXAMPLE 1

100 grams of sodium was placed in 400 cc. of toluene and the solvent was refluxed until the metal melted. Sufficient trimethylchlorosilane was added to reduce the boiling point of the liquid mixture to 101° C. 401 g. of p-chlorophenoxytrimethylsilane was mixed with 237 g. of trimethylchlorosilane and the mixture was added slowly to the molten sodium at a rate sufficient to keep the reaction mixture boiling gently. The mixture was agitated and refluxed for ½ hour after addition of the reactants was complete. The mixture was then cooled, filtered and the filtrate was distilled whereupon p-trimethylsilylphenoxy-trimethylsilane was obtained in a yield of 84 percent of theory.

EXAMPLE 2

The procedure of Example 1 was repeated using potassium instead of sodium and benzene instead of toluene. p-trimethylsilylphenoxytrimethylsilane was obtained.

EXAMPLE 3

To 36.8 g. of molten sodium and 400 cc. of toluene, sufficient trimethylchlorosilane was added to reduce the boiling point of the liquid mixture to 101° C. A mixture of 150 g. of p-chlorophenoxytrimethylsilane and 92 g. of ethyldimethylchlorosilane was added to the sodium at a rate sufficient that the solvent refluxed. After addition was complete the mixture was refluxed for ½ hour. Upon filtering and distilling the filtrate a mixture of the following products was obtained: 50 g. of p-trimethylsilylphenoxytrimethylsilane, 50 g. of p-ethyldimethylsilylphenoxytrimethylsilane and 55 g. of p - ethyldimethylsilylphenoxy - ethyldimethylsilane.

EXAMPLE 4

When a mixture of 200.5 g. of p-chlorophenoxytrimethylsilane and 130 g. of trimethylethoxysilane is reacted with 50 g. of molten sodium by the procedure of Example 1, p-trimethylsilylphenoxytrimethylsilane is obtained as a product.

EXAMPLE 5

When a mixture of 288.5 grams of

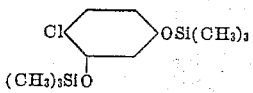

and 120 grams of trimethylchlorosilane is reacted with 50 g. of molten sodium by the procedure of Example 1, the product:

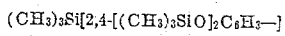

is obtained. The properties of this compound are shown in Example 7.

EXAMPLE 6

When a mixture of 235 g. of

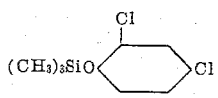

and 239 g. of trimethylchlorosilane is reacted with 100 g. of sodium by the procedure of Example 1, the product:

is obtained. The properties of this compound are shown in Example 7.

EXAMPLE 7

By employing the procedure set forth in Examples 1 to 3 inclusive, the compounds shown in the table below were prepared. In the table Me designates a methyl radical and Et designates an ethyl radical.

| Structure | B. P. °C. | mm. Press. | $n_D^{25°}$ | $D_4^{25°}$ |
|---|---|---|---|---|
| Me₃Si(p-OC₆H₄SiMe₃) | 132 | 25 | 1.4794 | 0.900 |
| Me₃Si(o-OC₆H₄SiMe₃) | 128 | 25 | 1.4830 | 0.910 |
| Me₃Si[2,4-(Me₃Si)₂C₆H₃O—] | 162 | 24 | 1.4843 | 0.899 |
| Me₃Si[3Me,4(Me₃Si)C₆H₃O—] | 148 | 24 | 1.4892 | 0.916 |
| Me₃Si[2,4-(Me₃SiO)₂C₆H₃—] | 169 | 19 | 1.4772 | 0.927 |
| Me₃Si(2-C₆H₅-4-Me₃SiC₆H₃O—) | 195 | 21 | 1.5329 | 0.974 |
| EtMe₂Si(o-Me₂SiC₆H₄O—) | 144 | 23 | 1.4873 | 0.9136 |
| EtMe₂Si(p-Me₂EtSiC₆H₄O—) | 164 | 25 | 1.4841 | 0.906 |
| Me₃Si(p-Me₂EtSiC₆H₄O—) | 144 | 23 | 1.4806 | 0.902 |
| Me₃Si(2-C₆H₅-6-Me₃SiC₆H₃O—) | 200 | 24 | (1) | (2) |

¹ Isomorphic.
² M. P. 62.9° C. and 71.6° C.

That which is claimed is:
1. Compounds of the formula

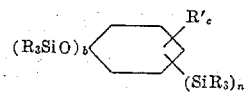

in which R represents an alkyl radical, R′ is a radical selected from the group consisting of alkyl and phenyl radicals, b is an integer of from 1 to 2 inclusive, c is an integer of from 0 to 1 inclusive, and n is an integer of from 1 to 2 inclusive.

2. Compounds in accord with claim 1 in which R represents a methyl radical.
3. Trimethylsilylphenoxytrimethylsilane.
4. (CH₃)₃Si[2-C₆H₅-4-[(CH₃)₃Si]C₆H₃O—]
5. (CH₃)₃Si[3-CH₃-4-[(CH₃)₃Si]C₆H₃O—]
6. (CH₃)₃Si[2,4-[(CH₃)₃Si]₂C₆H₂O—]
7. (CH₃)₃Si[2,4-[(CH₃)₃SiO]₂C₆H₃—]

8. The method which comprises reacting a halophenoxysilane of the formula

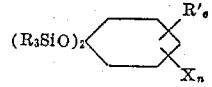

in which R represents an alkyl radical, R′ is a radical selected from the group consisting of alkyl and phenyl radicals, X is a halogen atom, c is an integer of from 0 to 1 inclusive, and n is an integer of from 1 to 2 inclusive, with a trialkylsilane of the formula R₃SiY in which R is an alkyl radical and Y is a substituent selected from the group consisting of halogen atoms and alkoxy radicals, by contacting the two with an alkali metal, whereby there is formed a compound of the formula:

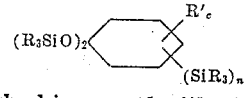

9. The method in accord with claim 8 wherein R represents a methyl radical.

10. The method which comprises reacting a halophenoxysilane of the formula

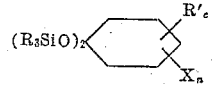

in which R represents an alkyl radical, R′ is a radical selected from the group consisting of alkyl and phenyl radicals, X is a halogen atom, c is an integer of from 0 to 1 inclusive, and n is an integer of from 1 to 2 inclusive, with a trialkylsilane of the formula R₃SiY in which R is an alkyl radical and Y is a substituent selected from the group consisting of halogen atoms and alkoxy radicals, by contacting the two in liquid phase with a molten alkali metal, whereby there is formed a compound of the formula

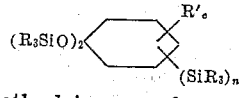

11. The method in accordance with claim 10 wherein R represents a methyl radical and the alkali metal is sodium.

JOHN L. SPEIER, Jr.

No references cited.